TELEVISION CABINET CONSTRUCTION

Filed June 14, 1954

INVENTORS.
CHARLES L. HUBBARD
KENNETH P. RUSSELL
BY
George R. Gust
ATTORNEY

United States Patent Office 2,850,343
Patented Sept. 2, 1958

2,850,343

TELEVISION CABINET CONSTRUCTION

Charles L. Hubbard and Kenneth P. Russell, Fort Wayne, Ind., assignors to International Telephone and Telegraph Corporation Application June 14, 1954, Serial No. 436,286

4 Claims. (Cl. 312—7)

The present invention relates to television cabinet construction and more particularly to an arrangement for detachably securing a picture tube cover plate and mask to a cabinet.

Cabinets for housing television receiving chassis conventionally include a transparent glass or the like plate disposed directly in front of the picture tube screen. This plate corresponds to a window since the viewer observes the screen through the plate.

After a period of ordinary usage, dust and dirt settles on the picture tube side of the cover plate, which necessitates cleaning the latter at frequent intervals in order to obtain maximum transmission of light. Some television sets currently on the market require removal of the chassis from the cabinet before the cover plate may be cleaned. Other designs require the removal of screws and the like which are accessible only from the interior of the cabinet. When it is desired to remove the cover plate for cleaning purposes, considerable difficulty is encountered, and as a result the plates are seldomly, if ever, cleaned. In order to obtain maximum performance from the television set, it is estimated that this cover plate should be cleaned at least once a month.

In view of the foregoing, it is an object of this invention to provide a television cabinet construction which is arranged to facilitate removal of the cover plate from the cabinet for cleaning.

It is another object of this invention to provide a television cabinet construction which includes a cover plate that may be removed from the front of the cabinet.

It is still a further object of this invention to provide a television cabinet construction having a cover plate which is detachably secured in place and which may be removed from the cabinet and thereafter replaced without the use of any special tools.

In accordance with the present invention there is provided a television cabinet construction which comprises a locking device for use in securing detachably a cover plate to a television cabinet, such cabinet having the usual openings for receiving control shafts. Locking means are mounted on the cabinet in registry with these openings and extend into operative locking engagement with the cover plate. Since this locking means is in registry with the aforesaid openings, access to the locking means for manipulating the latter is easy and convenient.

For a better understanding of the invention, together with other and further objects thereof, reference is made to the following description taken in connection with the accompanying drawing, the scope of the invention being defined by the appended claims.

Figures 1, 2, 3:
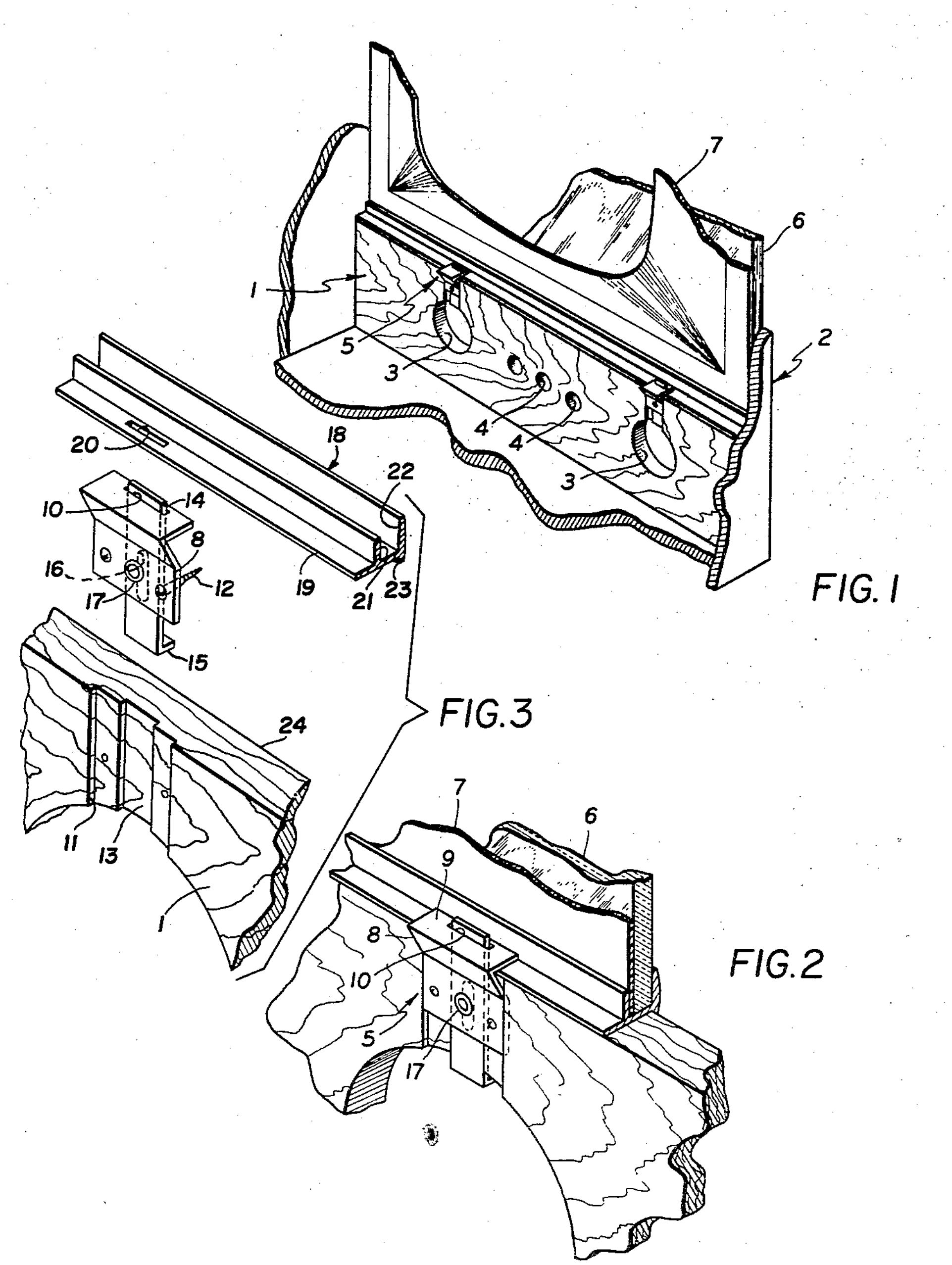
Fig. 1 is a fragmentary sectional view of an embodiment of this invention.
Fig. 2 is a similar enlarged section.
Fig. 3 is an exploded section demonstrating how the various parts fit together.

With reference to the drawings, Fig. 1 illustrates the front panel construction of a television cabinet from the interior. The back surface of the control panel 1 is therefore directly exposed to view in this drawing. This control panel 1, which is a part of the cabinet housing 2, contains the usual openings 3 and 4 which normally receive the control shafts of the various tuning controls. Such shafts may be connected to the station selector, contrast control, volume control, and so on.

In the illustrated embodiment, the two larger openings 3 are adapted to receive the shafts of the station selector mechanism and the volume control, respectively.

A locking mechanism indicated generally by the reference numeral 5 is secured to the panel 1 and is opeable to secure detachably the glass cover plate 6 and picture tube mask 7 in the front of the cabinet 2. This mechanism is more clearly illustrated in Figs. 2 and 3 and comprises a suitable metal bracket 8 having an offset flange 9 provided with a slot 10. The bracket 8 fits into a suitable recess 11 in the control panel and may be secured in place by means of the usual screws 12. A deeper recess or groove 13 is provided inside the recess 11 and is adapted to slidably receive an elongated element or catch 14. This catch 14 is preferably made of rigid material such as metal and is provided at its lower end with an operating flange 15. An elongated slot 16 is arranged longitudinally of the catch 14 and receives the shank of a suitable rivet 17 which is secured to the bracket 8. By means of this slot 16 and rivet 17 connection, the catch 14 may be reciprocated in the groove 13. As is shown in the drawings, the upper end of this catch 14 extends through the bracket slot 10.

An elongated retaining device or frame 18 of U-shaped cross section is provided with a flange extension 19 which is slotted at 20. As seen in Fig. 2, the cover plate 6 and mask 7 are normally retained between the upright walls 21 and 22 of the frame, and a small flange 23 projects downwardly from the wall 22 to engage the front side of the panel 1 (also as seen in Fig. 2).

This frame 18 preferably extends along the bottom edges of the cover 6 and mask 7 to secure the assembly to the cabinet.

To install the plate and mask 6, 7 into the cabinet, the catch 14 is pulled downwardly into the control shaft opening 3 until the upper end of the catch 14 passes through the slot 10. The frame 18 with the assembled plate and mask 6, 7 is then inserted into the cabinet frame opening 24 with the slot 20 in registry with the slot 10. The catch 14 is pushed upwardly through both the slots 10 and 20 to lock the frame 18 to the cabinet. Removal of the frame 18 is possible after merely pulling the catch 14 downwardly to release the frame 18.

The assembled upper marginal edges of the mask and glass are removably engaged with the corresponding portions of the cabinet opening in any suitable manner. Thus in assembling the glass and mask into the opening, the upper edges are first engaged with the cabinet opening and thereafter the retaining frame is moved into registry with the locking device 5.

To clean the cover plate 6, simply remove the tuning knobs from the control shafts which pass through the panel openings 3. This fully exposes the flange 15 of the catch 14. The catch is operated as explained before to release the frame from the cabinet.

Preferably, a friction washer is carried by the rivet 17 in between the bracket 8 and the slide 14 to retain the latter against accidental displacement.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A locking device for use in detachably securing television cabinet components in place comprising a television cabinet having openings for receiving control shafts, a retaining device adapted to hold a picture tube cover, said retaining device comprising a frame member of U-shaped cross section, the U-shaped portion being adapted to receive the edges of a picture tube cover, a flange on said frame member, and a locking mechanism mounted on said cabinet and comprising a supporting bracket, an operating element slidably retained by said bracket and extending into at least one of said openings, said operating element being movable into and out of a slot in said frame flange whereby said retaining device can be detachably secured to said cabinet by access to said openings.

2. A locking device for use in detachably securing television cabinet components in place comprising a television cabinet having openings for receiving control shafts, a retaining device adapted to hold a picture tube cover, said retaining device comprising a frame member, a flange on said frame member, and a locking mechanism mounted on said cabinet and comprising a supporting bracket, an operating element slidably retained by said bracket and extending into at least one of said openings, said operating element being movable into and out of a slot in said flange, whereby said retaining device can be detachably secured to said cabinet by access to said openings.

3. A locking device for use in detachably securing television cabinet components in place comprising a television cabinet having openings for receiving control shafts, a retaining device adapted to hold a picture tube cover, said retaining device comprising a frame member, and a locking mechanism mounted on said cabinet and comprising a supporting bracket, an operating element slidably retained by said bracket and extending into at least one of said openings, said operating element being movable into and out of a slot in said frame member whereby said retaining device can be detachably secured to said cabinet by access to said openings.

4. A locking device for use in detachably securing television cabinet components in place comprising a television cabinet having openings for receiving control shafts, a retaining device adapted to hold a picture tube cover, a locking mechanism mounted on said cabinet and comprising a supporting bracket, an operating element slidably retained by said bracket and extending into at least one of said openings, said operating element being movable into and out of a slot in said retaining device for detachably securing the latter to said cabinet by access to said openings.

References Cited in the file of this patent

UNITED STATES PATENTS

| | | |
|---|---|---|
| 311,910 | Moeller | Feb. 10, 1885 |
| 334,545 | Robinson | Jan. 19, 1886 |
| 355,497 | Bartlett | Jan. 4, 1887 |
| 900,121 | Pleins | Oct. 6, 1908 |
| 968,536 | Brucklacher | Aug. 3, 1910 |
| 2,251,038 | Danen | July 29, 1941 |